May 19, 1931.　　　A. SCHACHER　　　1,805,530
CLUTCH
Filed April 7, 1928
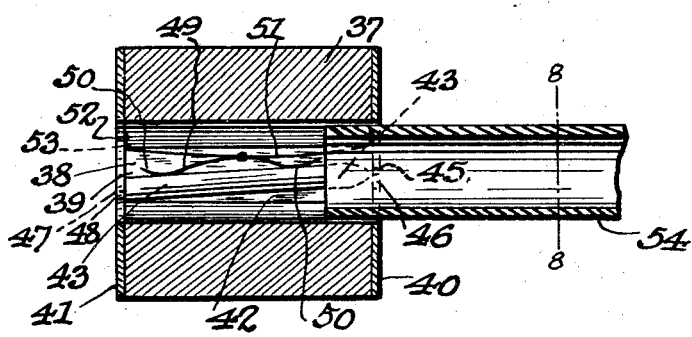
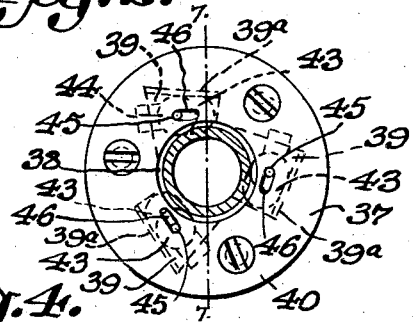
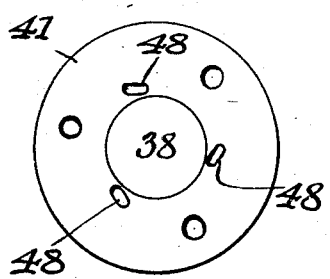
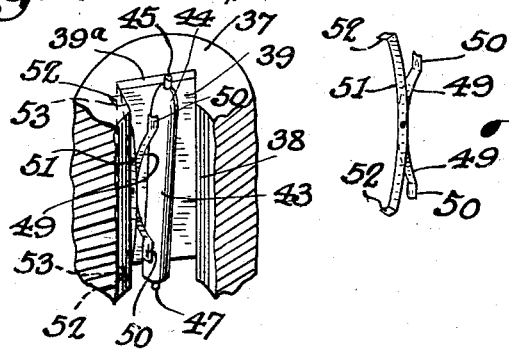
Inventor
Adolf Schacher
by his attorney
J. Edward Thebaud.

Patented May 19, 1931

1,805,530

UNITED STATES PATENT OFFICE

ADOLF SCHACHER, OF PHILADELPHIA, PENNSYLVANIA, ASSIGNOR OF ONE-HALF TO DANIEL SIMON, OF PHILADELPHIA, PENNSYLVANIA

CLUTCH

Application filed April 7, 1928. Serial No. 268,246.

This invention relates to clutches to be used in connection with lathes and revolving tools.

One of the objects of this invention is to provide clutching means for quickly attaching and detaching various revolving tools used in the various trades, such as in dental laboratories, machine shops and factories, where a variety of operations is to be carried out with the use of revolving tools, and where a quick change of tools is desirable and profitable.

Another object is to provide clutching means to be used in connection with tooling castings, or shafting, besides tubing.

With these and other objects, my invention resides in certain construction, one embodiment of which is shown in the drawings, is hereinafter described, its use is explained and what I claim is set forth.

In the drawings,

Figure 1 is a sectional side elevation of a hollow clutch form of my invention.

Figure 2 is an end elevation of the form shown in Figure 1.

Figure 3 is a plan of one of the end discs used on the form of invention shown in Figure 1.

Figure 4 is a perspective fragmentary view of the cushion spring and roller as used in the form shown in Figure 1.

Figure 5 is a perspective view of the cushion spring.

In the figures, the clutch shown has a body 37 formed with a cylindrical hole 38, running axially through the cylindrical body 37. In the wall of the hole 38 are three longitudinal recesses 39, running between the end disc plates 40 and 41, which are secured by screws to the body 37. The hole 38 continues through each plate 40 and 41. Each of the recesses 39 has a flat roller floor 42 which consists preferably of a hardened steel plate 39a fixed in the body 37. These floors 42 are each positioned parallel with and equidistant from the axis of the body 37. On each floor 42 rolls a roller 43, tapered at the end 44, terminating in a teat 45. The teats 45 enter slots 46 in the disc plate 40, and the teats 47 enter slots 48 in the disc plate 41. The set of slots 46 are positioned parallel and opposite the slots 48 and are parallel respectively with the floors 42. Back of each roller 43 is a curved leaf spring 49 having concave ends 50 fitting against the roller 43. Each spring 49 is riveted centrally to a leaf spring 51, curved in the opposite direction and has hook ends 52 engaging flat pockets 53, in the body 37 under the plates 40 and 41 which hold them in place fixed within the hollow clutch body.

Engaging the rollers 43 is shown a tube 54. But any round bar shaft or handle of the same diameter may be inserted instead of the tube 54.

Considering the operation of the clutch, the position of the parts shown in Figure 1 illustrates the inclined position of the roller 43, taken when the body 37 is starting to receive the tube 54. When the tube 54 is fully within the body 37, the rollers 43 become parallel with the axis of the body 37, in a position commensurate with the diameter of the tube 54. So, when the body 37 is turned by suitable means in one direction a gripping action takes place, while a turning in the opposite direction releases the tube 54.

It is possible to clutch other pieces than the tube 54 in this hollow clutch, providing the piece has the proper diameter. Various tools with handles having the proper diameter may thus be used with this form of clutch.

Inasmuch as changes in the form of clutch herein shown and described, may be made without departing from the spirit and scope of my invention, I wish to include all forms that come within the scope of the appended claims.

I claim,

1. In combination with a cylindrical piece of proper diameter, a clutching device adapted to be used therewith comprising a clutch body, a plurality of three or more, substantially flat floors, positioned longitudinally of said body in notches therein, a roller on each floor having a tapered forward end adapting said rollers to be adjusted automatically outward to engage the cylindrical surface of said piece, as said piece is entered into said body, and means for retaining said rollers upon said floors when disengaged with said piece.

2. In combination with a cylindrical piece of proper diameter, a clutch device adapted to have said piece used within the device, said device comprising a clutch body, having a plurality of three or more notches in said body running parallel with the axis of the same, substantially flat floors in said notches, having each a wall at an angle to the floor, a roller longitudinally positioned upon each of said floors, adapted each to contact said piece, and a leaf spring comprising two parts, one part having its ends turned for attachment to said wall, and the other part attached centrally to the first mentioned part, having its ends turned away from said wall and formed cup-shaped to fit against the roller on said floor.

3. A clutch device adapted to enclose a cylindrical piece, said device comprising a hollow body with a cylindrical bore running thru the same to contain said piece, there being longitudinal notches in the wall of said bore, a floor in each notch positioned parallel with the axis of said bore, a roller longitudinally positioned to roll on each floor, one end of each roller being tapered, and the tapered ends of said rollers being positioned in the same plane perpendicular to the axis of the device, said tapered ends being adapted by their tapered formation to be engaged by the entering end of said piece, and wedged outward to position the roller to contact along an elemental line of said cylindrical roller, when said roller is in operative position within said device.

ADOLF SCHACHER.